US006605654B1

(12) United States Patent
Fang et al.

(10) Patent No.: US 6,605,654 B1
(45) Date of Patent: Aug. 12, 2003

(54) TIRE SEALING AND INFLATING COMPOSITION AND METHOD OF USE

(75) Inventors: Jiafu Fang, Spring, TX (US); Dewey P. Szemenyei, The Woodlands, TX (US); Troy H. Scriven, Waterford, NY (US)

(73) Assignee: Pennzoil-Quaker State Company, Houston, TX (US)

( * ) Notice: Subject to any disclaimer, the term of this patent is extended or adjusted under 35 U.S.C. 154(b) by 220 days.

(21) Appl. No.: 09/616,360

(22) Filed: Jul. 14, 2000

Related U.S. Application Data

(60) Provisional application No. 60/143,925, filed on Jul. 14, 1999.

(51) Int. Cl.⁷ .......................... C09K 3/10; B29C 73/16; C08K 3/26; C08K 3/30
(52) U.S. Cl. ...................... 523/166; 524/423; 524/424; 524/425; 524/426; 528/490
(58) Field of Search .................. 523/166; 524/423, 524/424, 425, 426; 528/490, 486, 487

(56) References Cited

U.S. PATENT DOCUMENTS

| 1,863,157 A | 6/1932 | Geere |
| 3,833,041 A | 9/1974 | Glad et al. |
| 3,834,433 A | 9/1974 | Thompson |
| 3,850,217 A | 11/1974 | Edwards et al. |
| 3,877,496 A | 4/1975 | Sperberg |
| 3,912,562 A | 10/1975 | Garner |
| 3,931,843 A | 1/1976 | Edwards et al. |
| 3,946,783 A | 3/1976 | Edwards et al. |
| 3,976,221 A | 8/1976 | Martin et al. |
| 4,054,163 A | 10/1977 | Brown, Jr. et al. |
| 4,062,288 A | 12/1977 | Millray |
| 4,097,241 A | 6/1978 | Garner et al. |
| 4,163,467 A | 8/1979 | Dobson |
| 4,168,015 A | 9/1979 | Robinette |
| 4,489,855 A | 12/1984 | Boetger |
| 4,501,825 A | 2/1985 | Magyar et al. |
| 4,513,803 A | 4/1985 | Reese |
| 4,970,242 A | 11/1990 | Lehman |
| 5,110,014 A | 5/1992 | Doundoulakis |
| 5,124,395 A | 6/1992 | Abramowski et al. |
| 5,284,895 A | 2/1994 | Gupta |
| 5,338,776 A | 8/1994 | Peelor et al. |
| 5,458,165 A | 10/1995 | Liebmann, Jr. |
| 5,500,456 A | 3/1996 | Hughett et al. |
| 5,566,730 A | 10/1996 | Liebmann, Jr. |
| 5,618,912 A | 4/1997 | Fang |
| 5,705,604 A | 1/1998 | Fang |

FOREIGN PATENT DOCUMENTS

| DE | 45734 | 1/1889 |
| DE | 208187 | 3/1909 |
| DE | 2709166 A1 | 9/1978 |
| EP | 0129854 A1 | 1/1985 |
| EP | 867494 A3 | 9/1998 |
| WO | WO 99/36169 | 7/1999 |

OTHER PUBLICATIONS

F. Mahieux and M. Chevillon, *Un Générateur d'azote (II)*, No. 93, Mémoires Présentés A La Société Chimique, 1964, pp. 532–533.

*Primary Examiner*—Tae H. Yoon
(74) *Attorney, Agent, or Firm*—Jenkens & Gilchrist, P.C.

(57) ABSTRACT

A new composition, method, and apparatus for sealing and inflating a flat tire are described. The new composition includes a gas-generating agent and an activator, along with a sealant. In use, a gas propellant is generated in situ when the gas-generating agent is mixed with the activator. For example, carbon dioxide is generated when carbonates, such as baking soda, and an acid are mixed. The carbon dioxide gas generated in this manner can inflate a flat tire to a desired pressure. In addition to carbon dioxide, nitrogen gas, noble gases, and nitrous oxide gas may also be used instead.

13 Claims, 3 Drawing Sheets

TIRE SEALING AND INFLATING COMPOSITION AND METHOD OF USE

CROSS REFERENCE TO RELATED APPLICATIONS

The application claims priority to U.S. Provisional Application Serial No. 60/143,925, filed Jul. 14, 1999.

FIELD OF THE INVENTION

This invention relates to a composition, method, and apparatus for inflating and sealing inflatable objects. More particularly, the invention relates to a tire sealing and inflating composition, and a method and apparatus for using such compositions.

BACKGROUND OF THE INVENTION

Portable tire sealing and inflating devices have been used in emergency by a motorist to inflate and temporarily seal a pneumatic tire with a puncture wound when a service station or other repair facilities is not available to the motorist. The use of such devices, typically for an automobile, allows the motorist to drive the vehicle to a convenient location where the punctured or flat tire can be inspected and repaired. The availability of such devices obviates the need for the motorist to remove the flat tire from an automobile and replace it with a spare tire in order to reach a service station to repair the damaged tire. More importantly, such portable devices are extremely desirable if the motorist is stranded in a dangerous situation or if the motorist either does not have a spare tire or is physically unable to replace the flat tire with a spare tire.

Generally, a portable tire sealing and inflating device includes a conventional aerosol can containing a particular sealant composition which is introduced to the cavity of a flat tire through a valve stem. Typically, a length of flexible tubing connects a valve on the can with a threaded nozzle and connector on the remote end for attachment to and activation of the valve stem. Alternatively, the can is supplied with a pedestal valve for activation and dispensing of the contents without flexible tubing. A propellant within the can forces the sealant composition through the opened valve and into the tire. In this way, the tire is inflated and sealed.

At present time, most available portable tire sealing and inflating devices are based on aerosol, which is formed by a sealant composition and a propellant. Various hydrocarbons and chlorofluorocarbons have been used as propellants. However, hydrocarbon propellants are extremely flammable, and the chlorofluorocarbon (CFC) propellants have been found to have a detrimental effect on the earth's ozone layer and use thereof has been severely limited. Although some modified chlorofluorocarbons may not have substantial ozone-depleting potential, they may pose other environmental problems. For example, 1, 1, 2, 2-tetrafluroethane has been used as a non-flammable propellant. While not having stratospheric ozone-depletion potential, this extremely stable gas has a very significant global-warming potential (also referred to as the "greenhouse effect"). It is about 2,250 times as potent as carbon dioxide as a global-warming agent.

In contrast to hydrocarbons and chlorofluorocarbons, compressed gases, such as carbon dioxide, nitrous oxide, nitrogen, and air, are both environmentally-acceptable and non-flammable. However, these gases, by themselves, have not been successfully used in aerosol-based tire sealing and inflating devices. This is because relatively little of these gaseous propellants can be compressed into aerosol dispensers (regardless of the content) before the pressure exceeds 180 psig at 130° F. (the limit imposed by the U.S. Department of Transportation for -inter-state shipping purposes). For example, if one injects nitrogen gas into the largest aerosol can (about 48.6 in$^3$ capacity) until the pressure reaches 140 psig and connects this can to a relatively large P215/85R1 5 tire (about 2454 in$^3$ capacity if not flattened), the tire pressure could raise from 0 psig to about 2.7 psig. As such, many cans of compressed nitrogen gas would be required to obtain a reasonable tire pressure. Consequently, using compressed gases in a tire sealing and inflating device by themselves does not appear to be a viable option.

For the foregoing reasons, there exists a need for a tire sealing and inflating device that is not based on aerosol, and that uses a non-flammable, non-toxic, and environmentally-friendly propellant.

SUMMARY OF THE INVENTION

Embodiments of the invention meet the aforementioned need in one or more of the following aspects. In one aspect, the invention relates to a tire sealing and inflating composition. The composition includes: (a) a sealant; (b) a gas-generating agent not in the gaseous state; and (c) an activator separated from the gas-generating agent before use. The activator is capable of generating a gas in situ to propel the sealant when contacted with the gas-generating agent.

In another aspect, the invention relates to a tire sealing and inflating composition. The composition includes: (1) a sealant; (2) a carbonate; and (3) an acid separated from the carbonate before use and capable of reacting with the carbonate to release carbon dioxide. The carbon dioxide is capable of propelling the sealant into an inflatable object.

In still another aspect, the invention relates to a method of inflating an inflatable object. The method includes: (a) providing a tire sealing and inflating composition having a sealant, a gas-generating agent, and an activator where the gas-generating agent is separated from the activator; (b) forming a gas propellant in situ by contacting the gas-generating agent with the activator; and (c) causing the gas to propel the sealant into an inflatable object. The inflatable object is inflated by the gas and sealed by the sealant.

In yet another aspect, the invention relates to a tire sealing and inflating device. The tire sealing and inflating device includes: (1) a first compartment having a gas-generating agent; (2) a second compartment having an activator capable of generating a gas in situ when contacted with the gas-generating agent; (3) a separator between the first and the second compartments; (4) a mixing chamber for effectuating contact between the gas-generating agent and the activator; and (5) a connector between the mixing chamber and an inflatable object.

Additional aspects of the invention and the advantages of the embodiments of the invention are apparent with the following description.

DETAILED DESCRIPTION OF PREFERRED EMBODIMENTS

Figure 1:
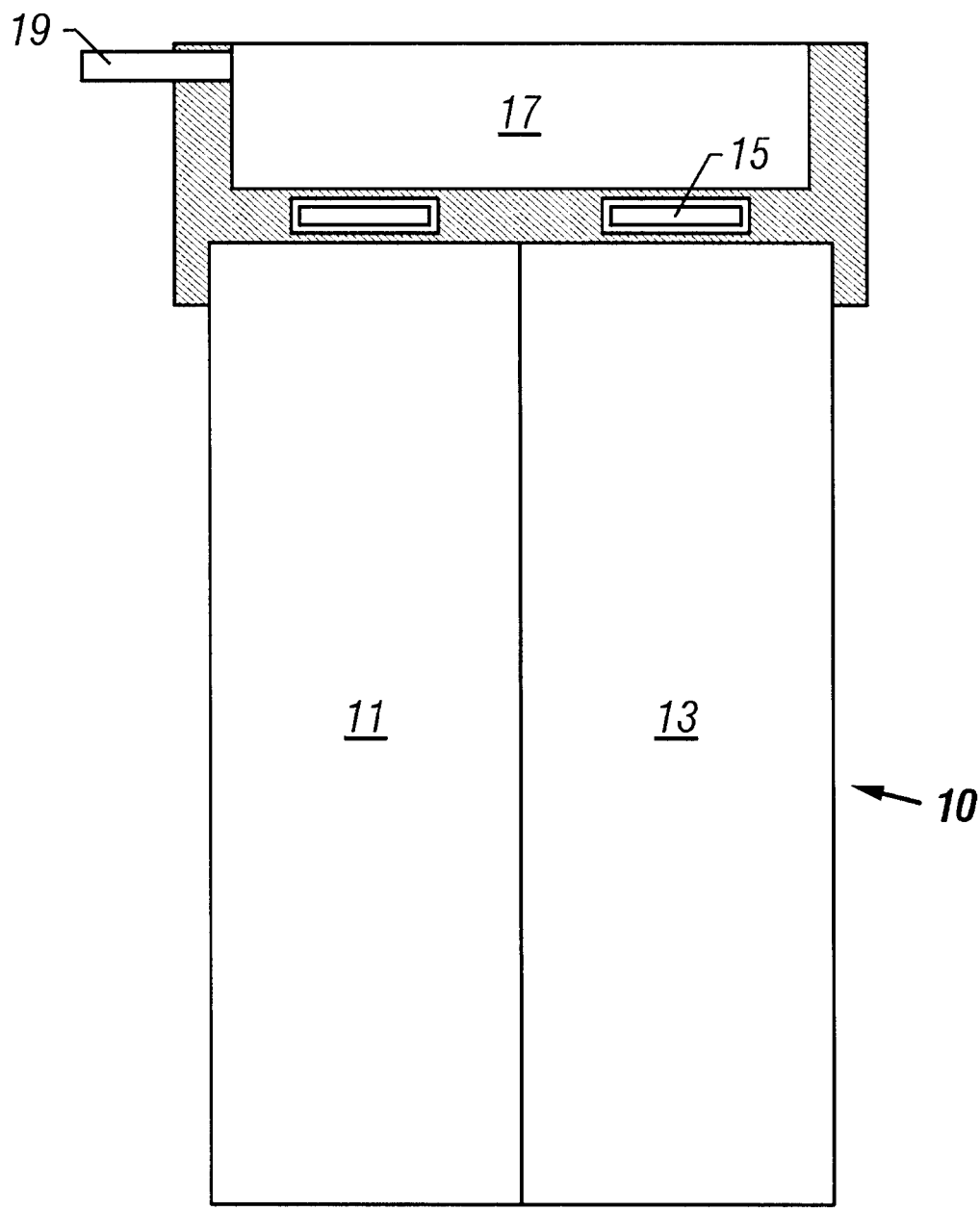
FIG. 1 is a schematic illustrating a tire sealing and inflating device having two compartments in accordance to one embodiment of the invention.

Embodiments of the invention are based, in part, on the recognition that a flat tire may be inflated to a desired pressure by utilizing the gas produced in a chemical reaction between two or more compounds. Furthermore, the gas may also be used as a propellant to introduce a sealant composition into a flat tire so that the tire can be properly inflated and sealed. In accordance with embodiments of the invention, a tire sealing and inflating composition is provided. The composition includes (1) a sealant; (2) a gas-generating agent not in the gaseous state; and (3) an activator separated from the gas-generating agent before application. The gas-generating agent is a compound capable of releasing a gas when activated. The activation may be achieved by contact with another compound (i.e., an activator) or by heat or light. Generally, the gas-generating agent is a solid or liquid, but not a gas The activator is capable of generating a gas in situ to propel the sealant when contacted with the gas-generating agent. In some embodiments, an additional gas propellant may be used to facilitate the contacting of the activator with the gas-generating agent.

When the tire sealing and inflating composition is used, the gas-generating agent is caused to be contacted with the activator to produce the desired gas propellant. Upon connection to a flat tire, the in situ generated gas inflates the flat tire and seals the puncture by delivering the sealant to the tire wound.

It should be recognized that any gas that can be produced by a chemical reaction of two or more compounds may be used in embodiments of the invention. In fact, a variety of chemical reactions may be utilized to generate the desired gas propellant which is non-flammable, non-toxic, and environmentally-friendly. However, economic consideration and environmental and safety concerns may suggest certain preferences. For example, nitrogen, carbon dioxide, nitrous oxide, and noble gases are non-flammable, non-toxic, and environmentally-friendly. Therefore, these gases may be preferred over other gases.

Suitable sealants include any composition that may be used to seal an opening in inflatable objects on contact with air. For example, a suitable composition includes any polymer latex emulsion, such as styrene-butadiene rubber ("SBR") latex emulsion, or a mixture of different latex emulsions, such as SBR and acrylic latex emulsions, or high-polymer resins dissolved in an appropriate solvent system. The solvent system may be aqueous or non-aqueous. If the system is aqueous, an additional emulsion stabilizer, i.e. emulsifier or mixtures thereof, may be added to the sealant to enhance its stability under both acidic and alkaline conditions. Suitable emulsifiers include, but are not limited to, cationic surfactants or quaternary surfactants such as Arquad®, Duoquad® manufactured by Akzo Nobel, non-ionic surfactants such as Triton X100®, and amphoteric surfactants such as Amphoterge®, Amphoteric®.

In some embodiments, an anti-freeze agent, such as ethylene or propylene glycol, or mixtures thereof, is used to lower the freezing point of the sealant for applications at lower ambient temperatures. In other embodiments, a fabric material, such as wood flour and synthetic or natural fibers, also is incorporated into the composition to help plug punctures occurred to a flat tire. Other ingredients, such as wetting agents such as Aerosol TO, foaming agents such as Foamtaine® or defoaming agents such as Defoamer® and Dow Corning Antifoam®, corrosion inhibitors such as ammonia and sodium chromate, and dispersing agents such as Dispex®, can be added if so desired.

Additional suitable resins, propellants, emulsifiers, corrosion inhibitors, freezingpoint depressants, and fibers are disclosed in the following U.S. Pat. Nos. 3,483,053; 4,501,825; 4,970,242; 5,124,395; 5,284,895; 5,439,947; 5,500,456; 5,618,912; 5,648,406; 5,705,604; 5,765,601; 5,834,534; 5,916,931; and 5,977,196. The disclosures of all of the preceding patents are incorporated herein by reference in their entirety. Table 1 in the following shows some exemplary sealant compositions. The listed ingredients and composition ranges are merely exemplary, and are not limitative of the invention as described herein. The numerical ranges are mere preferences, and compositions outside the numerical ranges also are acceptable. It should be understood that the numbers are approximate values.

TABLE I

Exemplary Sealant Composition

| Ingredient | Typical Wt % | Preferred Range |
|---|---|---|
| Formula 1 | | |
| SBR latex emulsion | 40.0 | 5.0 ~ 90.0% |
| ethylene glycol | 4.0 | 0.1 ~ 20.0 |
| Fiber, e.g., wood flour, synthetic or natural fibers | 1.0 | 0.1 ~ 10.0 |
| emulsifier(s) | 5.0 | 0.1 ~ 20.0 |
| additional water | balance | 0.1 ~ 20.0 |
| Formula 2 | | |
| polyacrylate latex emulsion | 50.0 | 5.0 ~ 90.0% |
| propylene glycol | 4.0 | 0.1 ~ 20.0 |
| Fiber, e.g., wood flour, synthetic or natural fibers | 1.0 | 0.1 ~ 10.0 |
| emulsifier(s) | 5.0 | 0.1 ~ 20.0 |
| dispersing agent | 5.0 | 0.1 ~ 20.0 |
| water | balance | |

Suitable gas-generating agents and their corresponding activators depend on the type of gases utilized to inflate a flat tire. For example, if nitrogen gas is desired, suitable gas-generating agents include, but are not limited to, hydrazines, azodicarbonamide, sodium azides, and suitable activators include, but are not limited to, iodine, hydrogen peroxide, iron oxide, chloramine, and heat.

In some embodiments, carbon dioxide is utilized to inflate a flat tire. Carbon dioxide offers the following advantages. First, it is relatively easy to generate carbon dioxide from a variety of gas-generating agents and activators. Second, the cost of generating carbon dioxide using these chemical compounds are relatively low. Third, these carbon dioxide generating compounds are safe. In fact, many of them are used as food stuff. Finally, carbon dioxide is not toxic, non-flammable, and not detrimental to the ozone layer. Numerous carbonate compounds may be used to generate carbon dioxide in the presence of an acid. In fact, any metal carbonate or ammonium carbonate is suitable as a gas-generating agent for carbon dioxide. For example, potassium bicarbonate or mixtures of carbonate salts, such as potassium bicarbonate and ammonium carbonate, may be used. It should be noted that a suitable gas-generating agent can be used in solid, in a solution, or in a slurry. Preferably, the carbonate salt or mixtures thereof is dissolved or dispersed in a solvent system, such as water. Table II in the following lists exemplary gas-generating agents for generating carbon dioxide. It should be understood that the weight percentage for each ingredient in the table is preferred, and that compositions outside the preferred ranges are may also be used.

Suitable activators to generate carbon dioxide include, but are not limited to, any organic, morganic, and polymeric acids that possess enough strength to liberate carbon dioxide from a gas-generating agent, such as potassium carbonate, potassium bicarbonate or mixtures of potassium bicarbonate and ammonium carbonate dissolved or dispersed in a solvent system (e.g., water). Preferably, the acid should have a dissociation constant K higher than $10^{-10}$ at ambient temperature. Table III in the following lists some exemplary activators for generating carbon dioxide. Again, the weight percentage for each ingredient in the table is preferred, and compositions outside the preferred ranges are may also be used.

TABLE II

Exemplary Gas-Generating Agent Composition

| Ingredient | Typical Wt % | Preferred Range |
|---|---|---|
| Formula 3 | | |
| sodium bicarbonate | 50.0 | 5.0 ~ 90.0% |
| dispersing agent | 5.0 | 0.1 ~ 20.0 |
| water | balance | |
| Formula 4 | | |
| sodium carbonate | 50.0 | 5.0 ~ 90.0% |
| dispersing agent | 5.0 | 0.1 ~ 20.0 |
| water | balance | |
| Formula 5 | | |
| potassium bicarbonate | 50.0 | 5.0 ~ 90.0% |
| dispersing agent | 5.0 | 0.1 ~ 20.0 |
| water | balance | |
| Formula 6 | | |
| potassium carbonate | 50.0 | 5.0 ~ 90.0% |
| dispersing agent | 5.0 | 0.1 ~ 20.0 |
| water | balance | |
| Formula 7 | | |
| ammonium bicarbonate | 50.0 | 5.0 ~ 90.0% |
| dispersing agent | 5.0 | 0.1 ~ 20.0 |
| water | balance | |
| Formula 8 | | |
| ammonium carbonate | 50.0 | 5.0 ~ 90.0% |
| dispersing agent | 5.0 | 0.1 ~ 20.0 |
| water | balance | |
| Formula 9 | | |
| ammonium bicarbonate | 10.0 | 5.0 ~ 90.0% |
| potassium bicarbonate | 40.0 | 5.0 ~ 90.0% |
| dispersing agent | 5.0 | 0.1 ~ 20.0 |
| water | balance | |
| Formula 10 | | |
| ammonium bicarbonate | 10.0 | 5.0 ~ 90.0% |
| calcium carbonate | 40.0 | 5.0 ~ 90.0% |
| dispersing agent | 5.0 | 0.1 ~ 20.0 |
| water | balance | |

TABLE III

Exemplary Activator Composition

| Ingredient | Typical Wt % | Preferred Range |
|---|---|---|
| Formula 11 | | |
| acetic acid | 50.0 | 5.0 ~ 100.0 |
| water | balance | |
| Formula 12 | | |
| citric acid | 50.0 | 5.0 ~ 100.0 |
| water | balance | |

TABLE III-continued

Exemplary Activator Composition

| Ingredient | Typical Wt % | Preferred Range |
|---|---|---|
| Formula 13 | | |
| maleic acid | 50.0 | 5.0 ~ 100.0 |
| water | balance | |
| Formula 14 | | |
| polyacrylic acid | 50.0 | 5.0 ~ 100.0 |
| water | balance | |
| Formula 15 | | |
| sodium hydrogen sulfate | 30.0 | 5.0 ~ 100.0 |
| water | balance | |
| Formula 16 | | |
| phosphoric acid | 20.0 | 5.0 ~ 100.0 |
| tartaric acid | 30.0 | 5.0 ~ 100.0 |
| water | balance | |

Figure 2:
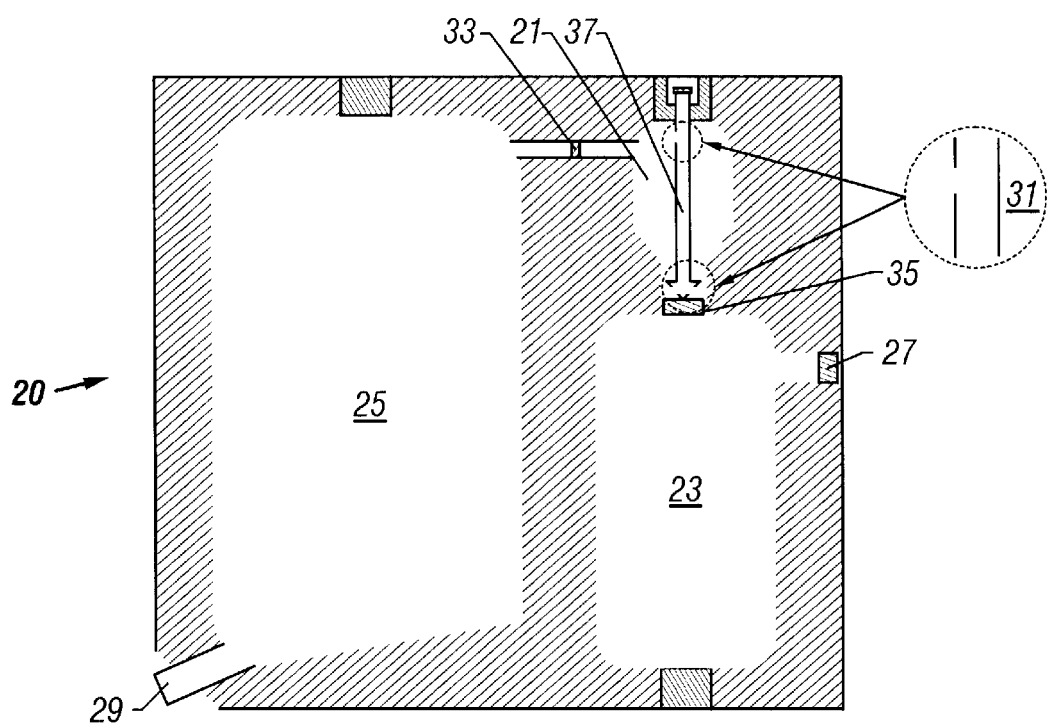
FIG. 2 is a schematic of a tire sealing and inflating device having three compartments in accordance with another embodiment of the invention.
Figure 3:
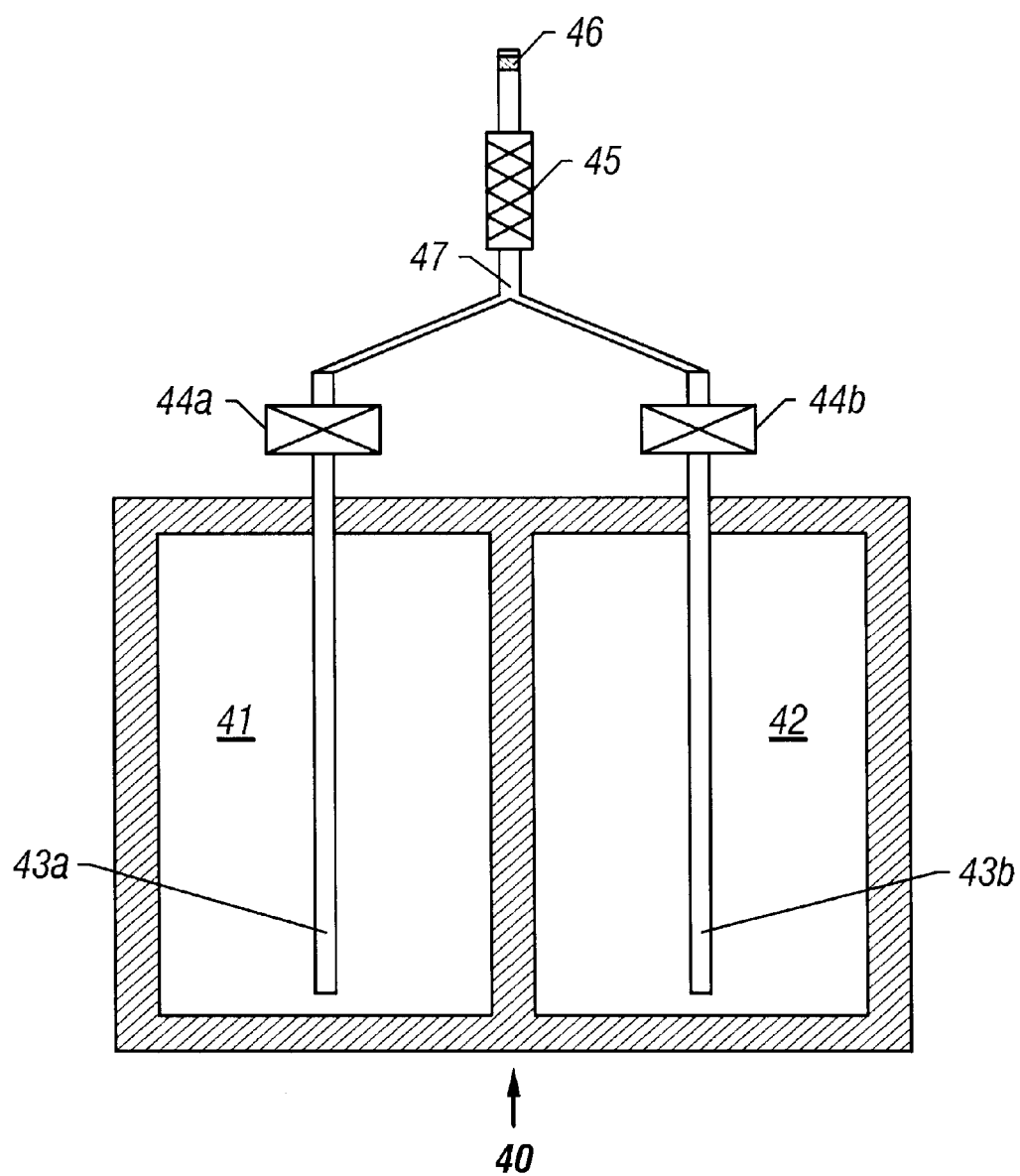
FIG. 3 illustrates still another embodiment of the invention.

In addition to new compositions for sealing and inflating a tire, embodiments of the invention also provide a portable tire sealing and inflating device. The device includes (1) a first compartment that contains a gas-generating agent; (2) a second compartment that includes an activator; (3) a separator between the first and the second compartments; (4) a mixing chamber for effectuating contact between the gas-generating agent and the activator; and (5) means for connecting the mixing chamber and a flat tire. In this device, the separator keeps the gas-generating agent and the activator separate until the device is used. During use, the separator is removed, broken, or opened so that the gas-generating agent and the activator may come into contact to produce a desired gas propellant. A sealant may be mixed either with the gas-generating agent or the activator. Alternatively, a separate chamber or compartment for the sealant may also be used. A suitable separator may include a valve or any other devices. The means for connecting the mixing chamber and a flat tire preferably is a flexible hose, although any other gas-delivery devices may also be used. Preferably, the tire sealing and inflating device includes a mixer or a similar component to effectuate efficient mixing between the gas-generating agent and the activator. FIGS. 1–3 illustrate representative embodiments of the tire sealing and inflating device in accordance with the invention.

Referring to FIG. 1, a tire sealing and inflating device 10 includes two compartments 11 and 13. One may be used to store a gas-generating agent, and the other may be used to store an activator. The gas-generating agent and the activator are kept separately a separator 15. A mixing chamber 17 is connected to the compartment 11 and the compartment 13. A discharge port 19 is provided in connection with the mixing chamber 17. To use the device 10, a flexible hose with an appropriate adapter on the far end is attached to the discharge port 19 (the flexible hose is not shown in the figure). The flexible hose is also attached to a tire valve so that the gas generated in the mixing chamber 17 may be delivered to a flat tire (not shown). After the separator 15 is removed or broken, mixing of the gas-generating agent and the activator is effected in the mixing chamber 17. The sealant contained therein is propelled by the gas generated in the mixing chamber into the flat tire, thereby sealing the puncture wound and inflating the tire. FIG. 2 illustrates another embodiment of the tire sealing and inflating device. Referring to FIG. 2, a tire sealing and inflating device 20 includes a first compartment 21, a second compartment 23, and a sealant chamber 25. The first and the second compartments 21 and 23 may be used to store a gas-generating agent and an activator respectively. An actuator 37 is attached to the first compartment 21. The actuator 37 includes multiple venting ports 31. These venting ports 31 allow mixing between the gas-generating agent and the activator after the separator 35 between the two compartments is removed or broken. A discharge port 29 is attached to the sealant chamber 25. There is a seal 33 between the sealant chamber 25 and the first compartment 21. After a gas is generated in the second compartment 23, compartments 21 and 23 are pressurized, and the seal 33 is broken under pressure, allowing the gas to enter the sealant chamber 25. The gas then pressurizes upon the sealant composition and forces it to discharge through the discharge port 29 into a flat tire. To use this device, a flexible hose with an appropriate adapter is attached to the discharge port 29 and a tire valve (not shown).

FIG. 3 illustrates still another embodiment of the tire sealing and inflating device. Referring to FIG. 3, a tire sealing and inflating device 40 includes two separate compartments 41 and 42. An in-line mixer 45 is connected to the compartment A and compartment B by a pair of dip tubes (43a and 43b). The two dip tubes are joined at a joint 47. Each dip tube 43a or 43b includes a valve (44a or 44b). The in-line mixer 45 further includes an adapter 46 for connection to a flexible hose.

In this embodiment, a gas-generating agent and an activator are stored in the compartment A and compartment B, respectively. Both compartments are filled with an inert gas, such as air or nitrogen, which is used to facilitate the dispensing of the contents of the compartments. Preferably, the inert gas pressure should be in the range from about 10 to about 100 psi, although other pressure ranges are also acceptable.

Upon opening of the valves 44a and 44b, the gas-generating agent and the activator are propelled from their respective compartments into their respective dip tubes and meet at the joint 47. The in-line mixer 45 facilitates the mixing of the gas-generating agent and the activator. A gas is thus generated in situ for inflating a flat tire.

It should be noted that the use of an inert gas in the compartments 41 and 42 is entirely optional. Any gas may be used to facilitate the dispersing of the contents, i.e., the gas-generating agent and the activator, of the compartments.

With respect to other suitable dispensing mechanisms, they include, but are not limited to, positive displacement such as piston operated devices, pre-pressurization by a minimal amount of inert gas such as bag-in-can, or by other mechanical means such as the contracting elastic force of a pre-filled rubber tube. All these systems preferably dispense the gas-generating agent and the activator solutions in a constant ratio and allow for good mixing before the mixture entering a wound tire.

While it is preferred that the gas-generating agent, the activator, and the sealant be premixed before being delivered to an inflatable object, such delivery can occur sequentially. For example, each of the suitable sealant, gas-generating agent, and activator may be stored in a separate container respectively. When in use, each component is delivered to an inflatable object separately. Any sequence of delivery may be used. The gas-generating agent and the activator mix and react inside the object to generate a gas to inflate it. The sealant seals the puncture. In these embodiments, a mixing chamber would not be necessary.

The following examples demonstrate methods of using the new tire sealing and inflating compositions to inflate a flat tire. These examples are given to illustrate embodiments of the invention and are not intended to limit the scope of the invention otherwise described herein.

EXAMPLE 1

About 288 grams of Formula 11 of Table III were premixed with about 100 grams of Formula 1 of Table I. The resulting composition was packed in one of the compartments of FIG. 1. About 332 grams of Formula 6 of Table II was packed in the other compartment. The device was connected to a flat tire of the size of P 195/75R14. Carbon dioxide was generated when the separator was removed and mixing between the two separate solutions was made to occur in the mixing chamber. The carbon dioxide propelled the sealant contained in the mixing chamber into the tire. The tire pressure increased shortly from 0 to about 12 psig.

EXAMPLE 2

About 200 grams of Formula 1 of Table I were packed in the sealant compartment 25 of FIG. 2, about 155 grams Formula 12 of Table III in the first compartment 21, and about 240 grams of Formula 5 of Table II in the second compartment 23. The device was connected to a flat tire of the size of P195/75R14. After the reactants in compartments 21 and 23 were mixed, carbon dioxide gas was generated immediately which broke the seal 33 between the sealant chamber 25 and the first compartment 21. The carbon dioxide gas propelled the sealant contained in the sealant chamber 25 into the flat tire. The tire pressure increased shortly from 0 to about 12 psig.

As demonstrated above, embodiments of the invention provide a composition, method, and apparatus for sealing and inflating a flat tire. The embodiments of the invention may have one or more of the following advantages. First, the tire sealing and inflating device is safe to operate because it does not contain flammable gases. Second, the device is environmentally-friendly because it does not use ozone-depleting compounds, such as chlorofluorocarbons. Third, it is relatively easy to operate the device because minimal human interaction is required. Finally, it is cost-effective to manufacture the devices in accordance with embodiments of the invention. Other advantages and properties are apparent to a person of ordinary skill in the art.

While the invention has been described with respect to a limited number of embodiments, other modifications or variations exists. For example, although non-flammable, non-toxic, and environmentally-friendly gases are preferred, other gases that do not meet all three requirements may still be used in some embodiments of the invention. It should be recognized that any gas-generating chemical reactions may be used in embodiments of the invention. These reactions are not limited to those involving one gas-generating agent and one activator. Multiple gas-generating agents and/or multiple activators also may be used. Although the activators are described as acids with respect to generating carbon dioxide, they are by no means limited to acids. For other gas-generating reactions, the activators may be basic or neutral. The activators can also be thermal energy or photon energy. While the invention is described with respect to a flat tire, the application of the invention is not limited only to a flat tire. Rather, the invention is applicable to any inflatable object. Such objects include, but are not limited to, balloons, inflatable toys, life savers, beach balls, etc. As to the construction of the tire sealing and inflating device, one or more components may be merged into another component so long as they achieve substantially the same results. The appended claims are intended to cover all such modifications and variations as fall within the scope of the invention.

What is claimed is:

1. A tire sealing and inflating composition, comprising:
   a sealant;
   a gas-generating agent not in the gaseous state and capable of releasing carbon dioxides; and
   an activator compound separated from the gas-generating agent before use, the activator compound capable of generating a gas in situ to propel the sealant when contacted with the gas-generating agent, wherein the activator compound is sodium hydrogen sulfate.

2. The tire sealing and inflating composition of claim 1 wherein the carbon dioxide is capable of propelling the sealant into an inflatable object.

3. The tire sealing and inflating composition of claim 1, wherein the sealant is mixed with the gas-generating agent before use.

4. The tire sealing and inflating composition of claim 1, wherein the sealant is a polymeric resin.

5. The tire sealing and inflating composition of claim 1, wherein the sealant is a latex emulsion.

6. The tire sealing and inflating composition of claim 1, wherein the activator compound is capable of reacting with the gas-generating agent to generate the gas.

7. The tire sealing and inflating composition of claim 1, further comprising a freezing point depressant.

8. The tire sealing and inflating composition of claim 7, wherein the freezing point depressant is ethylene glycol, propylene glycol, or a mixture thereof.

9. The tire sealing and inflating composition of claim 1, further comprising fibers.

10. The tire sealing and inflating composition of claim 1, further comprising an emulsifier.

11. The tire sealing and inflating composition of claim 1, further comprising a dispersing agent.

12. The tire sealing and inflating composition of claim 1, wherein the tire sealing and inflating composition is aqueous.

13. The tire sealing and inflating composition of claim 1, wherein the tire sealing and inflating composition is contained in a can.

* * * * *